United States Patent
Strasman

(10) Patent No.: US 7,971,215 B1
(45) Date of Patent: Jun. 28, 2011

(54) SYSTEM, METHOD AND COMPUTER READABLE MEDIUM FOR MANAGING MEDIA STREAMS

(75) Inventor: Nery Strasman, Ramat Gan (IL)

(73) Assignee: Bigband Networks Inc., Redwood City, CA (US)

(*) Notice: Subject to any disclaimer, the term of this patent is extended or adjusted under 35 U.S.C. 154(b) by 819 days.

(21) Appl. No.: 11/774,601

(22) Filed: Jul. 8, 2007

Related U.S. Application Data

(60) Provisional application No. 60/826,179, filed on Sep. 19, 2006.

(51) Int. Cl.
*H04N 7/10* (2006.01)
*H04N 7/025* (2006.01)

(52) U.S. Cl. .......... 725/34; 375/240.25; 375/240.26

(58) Field of Classification Search .......... None
See application file for complete search history.

(56) References Cited

U.S. PATENT DOCUMENTS

| | | | |
|---|---|---|---|
| 6,029,045 A * | 2/2000 | Picco et al. | 725/34 |
| 6,438,171 B1 * | 8/2002 | Cartwright et al. | 375/240.26 |
| 2003/0174837 A1 * | 9/2003 | Candelore et al. | 380/210 |
| 2004/0015316 A1 * | 1/2004 | Sarfati et al. | 702/122 |
| 2004/0187161 A1 * | 9/2004 | Cao | 725/110 |
| 2006/0168616 A1 * | 7/2006 | Candelore | 725/34 |
| 2007/0055983 A1 * | 3/2007 | Schiller et al. | 725/32 |

* cited by examiner

*Primary Examiner* — Andrew Y Koenig
*Assistant Examiner* — Jason Chung
(74) *Attorney, Agent, or Firm* — Oren Reches

(57) ABSTRACT

A method, system and computer readable medium for managing media streams, the computer readable medium has computer-readable code embodied therein for sharing media content, the computer-readable code comprising instructions for: associating different program map tables with devices of different users that are scheduled to filter, at a certain point of time, streams that form a same program; wherein the different program map tables reflect streams that should be filtered by devices of the different users.

30 Claims, 5 Drawing Sheets

SYSTEM, METHOD AND COMPUTER READABLE MEDIUM FOR MANAGING MEDIA STREAMS

RELATED APPLICATION

This application claims the priority of U.S. provisional patent application Ser. No. 60/827,196 filing date Sep. 27, 2007.

FIELD OF THE INVENTION

The invention relates to methods, systems and computer readable medium for managing media streams.

BACKGROUND OF THE INVENTION

MPEG Compliant Streams

Methods and systems for compressing and transmitting media signals are known in the art. Compressed digital video is largely becoming the preferred medium to transmit to video viewers everywhere. Part of the Moving Pictures Experts Group (MPEG) specifications are standardized methods for compressing and transmitting video. Various audio compression techniques are also known in the art. In general, MPEG is used today for transmitting video over terrestrial, wireless, satellite and cable communication channels and also for storing digital video.

An audio stream is organized as an ordered sequence of frames. A video stream is usually organized as an ordered sequence of pictures. Each picture includes a plurality of slices, each slice including a plurality of macro blocks. The audio and video streams are provided to an audio encoder and video encoder respectively to generate compressed audio and video elementary streams, also referred to as elementary streams.

Elementary streams are packetized to produce PES packets. PES packets made up of elementary streams that form a program share a common time base. The PES packets may also include additional information. PES packets of distinct elementary streams can be arranged as a Transport Stream.

A Transport Stream combines one or more programs with one or more independent time bases into a single stream. Transport Streams include Transport packets of 188 bytes. Transport Stream packets start with a Transport packet header. The header includes a packet identifier (PID). Transport Stream packets of one PID value carry data of a single elementary stream. The packet identifiers are used by user devices to filter selected streams (relating, for example, to a certain television channel to which the user wishes to be tuned to) out of the Transport Stream.

A Transport Stream includes Program Specific Information (PSI) tables. The PSI tables specify which PIDs and accordingly which elementary streams are associated to form each program.

The PSI tables include a Program Association Table (PAT) and a Program Map Table (PMT) as well as other tables. Each table is encapsulated in multiple Transport Stream packets. Packets that convey the PAT have a zero valued PID. PAT lists PID values for all PMT. The PAT lists two sets of values—one is a programs number (PN) and the other is the PID value of the program map table associated with that program number. Program Number values are associated with television channels. It is assumed that a certain television channel broadcasts a certain program at a certain point in time. This program includes multiple elementary streams that are multiplexed together and broadcast to multiple user devices.

A program map table lists PID values of all the streams (audio, video, data, etc.) that form a program. A program map table may also include additional metadata pertaining to these streams.

If a user requests to be tuned to a certain television channel (such as but not limited to HBO, CNN, National Geographic, CBA, NBC, Channel four, and the like) a user device (such as a set top box) performs the following operations: (i) retrieve the PAT (filtering zero value PID packets), (ii) find (using the program number associated with the certain television channel) the PID value of the program map table associated with the television channel, (iii) filters the packets that convey the various elementary streams of a program that is being broadcast by the selected television channel based upon their PID values (as listed in the program map table). It is noted that the filtering process is also known as extraction.

Program Duplication

Typically, even temporal mismatch between otherwise identical programs may lead to the duplication of these programs. For example, even if both users are tuned to the same television channel but thy are scheduled to receive different advertisements then the programs sent to these users may be duplicated.

There is a need to provide systems and methods that can efficiently utilize the bandwidth of program conveying networks.

SUMMARY OF THE INVENTION

A method for managing streams, the method includes: associating different program map tables with devices of different users that are scheduled to filter, at a certain point of time, streams that form a same program; wherein the different program map tables reflect streams that should be filtered by devices of the different users.

A system for managing streams, the system includes: a controller, adapted to associate different program map tables with devices of different users that are scheduled to filter, at a certain point of time, streams that form a same program; wherein the different program map tables reflect streams that should be filtered by devices of the different users.

A computer readable medium having computer-readable code embodied therein for sharing media content, the computer-readable code comprising instructions for: associating different program map tables with devices of different users that are scheduled to filter, at a certain point of time, streams that form a same program; wherein the different program map tables reflect streams that should be filtered by devices of the different users.

BRIEF DESCRIPTION OF THE DRAWINGS

The abovementioned and other objects, features, and advantages of the present invention will become more apparent from the following detailed description, when applied in conjunction with the accompanying drawings. In the drawings, similar reference characters denote similar elements throughout the different views, in which.

DETAILED DESCRIPTION OF THE DRAWINGS

The term "television channel" can be interpreted in the normal conventional sense, and can also mean a television station or its cable/satellite counterpart.

The term "mapping information" can be interpreted in the normal conventional sense and can also mean information that maps Program Number values and either one of (i) devices of users or (ii) selection of television channels by different users. Thus, for example a certain Program Number value can be allocated per a certain user device or per a selection of a certain television channel by a user of a certain user. In the latter case multiple Program Number values can be allocated per user.

The term "association information" can be interpreted in the normal conventional meaning and can also mean a combination of mapping information and program association table (PAT). Association information maps between a PID value of a program map table (PMT) and either a user device or a selection of a television channel by a user.

For simplicity of explanation the following pages will describe a MPEG-2 compliant system and method. It is noted that the scope of the invention is not necessarily limited to MPEG compliant Transport Streams.

Figure 1:
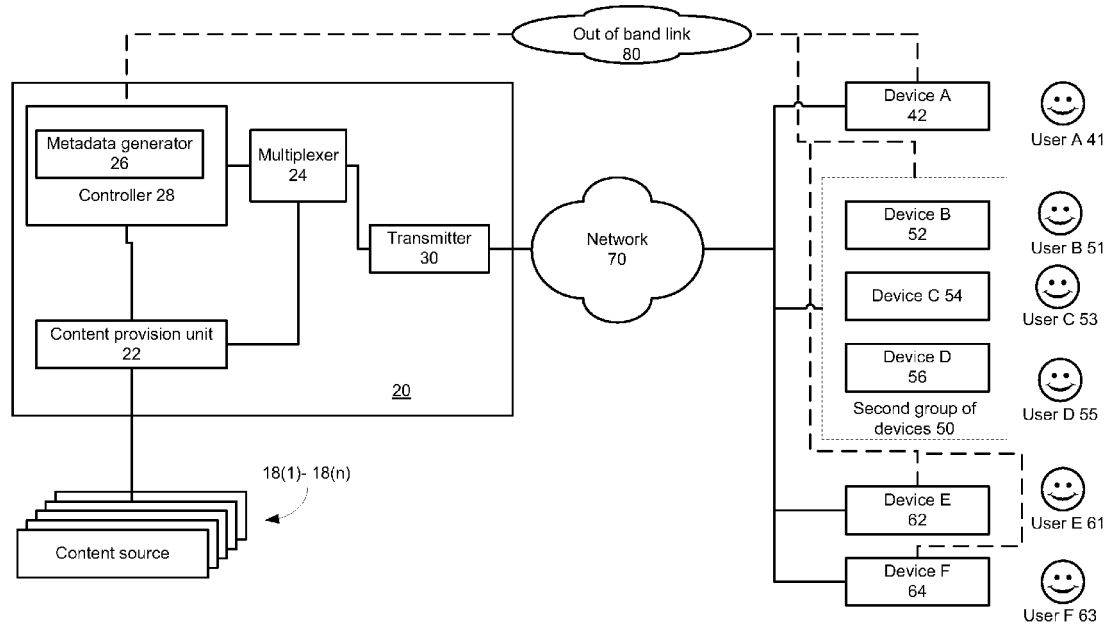
FIG. 1 illustrates a system and its environment, according to an embodiment of the invention.

FIG. 1 illustrates system 20 and its environment according to an embodiment of the invention.

System 20 is connected, via network 70 and out of band link 80 to user devices A-F 42-64 of users A-F 41-63. A user device is a device that is able to receive a multiplex of programs from network 70 and filter a selected program that represents content that is broadcast from a certain television channel at a given point in time. A typical user device is a set top box, but other user devices can be used to filter programs.

System 20 includes controller 28, multiplexer 24, transmitter 30 and content provision unit 22. Controller 28 includes metadata generator 26 and is connected to various components of system 20, such as but not limited to multiplexer 24 and content provision unit 22.

Controller 28 can coordinate the operation of these components and determine which programs to send to multiplexer 24, which metadata should be generated, how to process content streams and perform other or alternative tasks.

It is assumed that at a certain point in time user A 41 and users B-D 51-55 request to view the same television channel. While users B-D 51-55 belong to a second group of users user A 41 belongs to a first group of users. The grouping can be tailored for addressed advertisement purposes, but this is not necessarily so.

It is further assumed that user devices A-D 42-56 receive the same multiplex of programs and that at a certain point in time users A-D 42-56 are scheduled to view the same television channel. The program that represents the content of that television channel will be later referred to as the K'th program.

Controller 28 can receive requests to view a certain television channel over out of band link 80. The requests originate from users A-F 41-63 and can be sent from user devices A-F 42-64.

Metadata generator 26 can generate various PSI tables and mapping information. The PSI tables include, for example, a PAT and a PMT. The mapping information maps between Program Number values and a devices of users. For example, user device A 42 can be notified that it (or user A 41) is associated with a certain Program Number value while user device B 52 can be notified that it (or user B 51) is associated with another Program Number value. Thus, even if both users request to view the same television channel, each of their user devices will filter a different program map table.

Conveniently, the mapping information is sent out of band, but this is not necessarily so. Multiple PSI tables are multiplexed in the multiplex of programs and are received concurrently by different user devices. The association information assists different user devices to filter different program map tables.

The PSI tables and the mapping information are generated by metadata generator 26 while the PSI tables are sent to multiplexer 24 and are multiplexed with content provided to multiplexer 24 by content provision unit 22.

Content provision unit 22 can receive content from multiple content sources 18(1)-18(n). The content can include video content, audio content, data content and the like. The content can either be provided to content provision unit 22 in an elementary stream format (such as but not limited to MPEG compliant elementary stream format) or can be processed, at least partially by content provision unit 22, to be output in an elementary stream format.

Multiplexer 24 multiplexes metadata and elementary streams to provide a multiplexed signal that is also referred to as a multiplex of programs. The multiplex of programs is sent to transmitter 30 and then transmitted, via network 70, to user devices A-F 42-64.

Those of skill in the art will appreciate that system 20 can perform additional tasks such as media compression, media encoding, media encryption, modulation, PID re-mapping and the like. The various components of system 20 (multiplexer 24, transmitter 30, content provision unit 22 and metadata generator 26) can include hardware, software and/or firmware modules, can be proximate to each other, distant from each other, partially integrated with each other and the like.

System 20 can alter the content of the multiplex of programs, in response to various parameters such as but not limited to requests from users to be tuned to certain television channels (or to receive other content), user profiles (socio-economic profile, viewing patterns), network limitations and capabilities, user device limitations and capabilities, profiles of the different users and the like.

System 20 can send different programs to different users without necessitating a duplication of identical elementary streams that belong to different programs. Instead, it sends metadata that enables the user devices to be tuned to these different programs.

Figure 2:
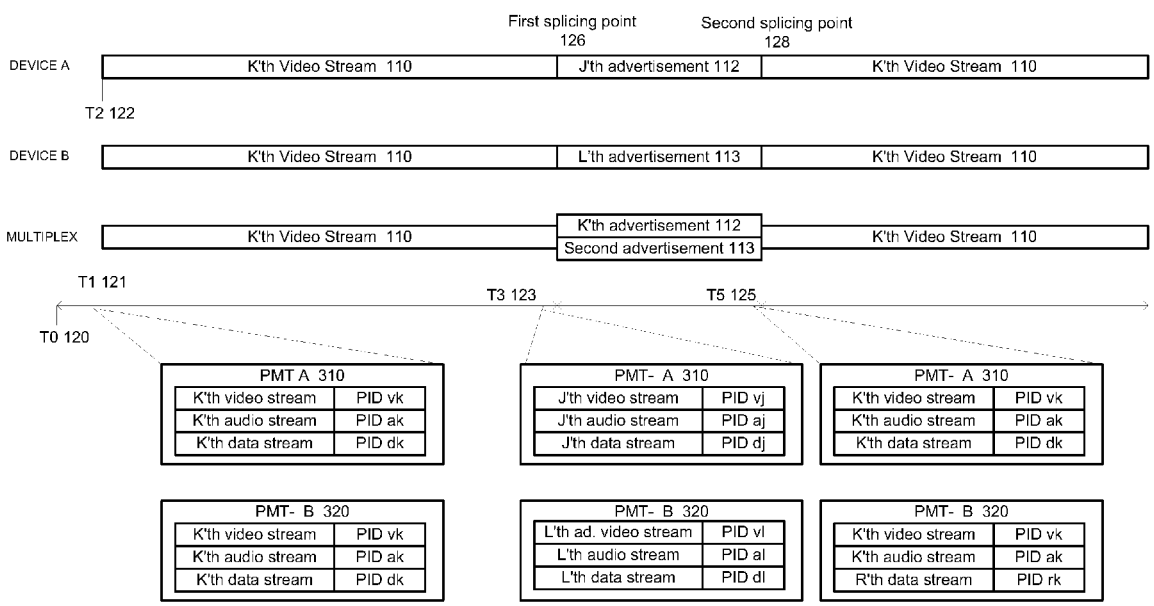
FIG. 2 illustrates multiple streams and program map tables that are sent to two users, according to an embodiment of the invention.

FIG. 2 illustrates multiple streams and program map tables that are sent to two users, according to an embodiment of the invention.

At point in time T0 120 system 20 decides to associate different program map tables with user A 41 and the second group of users 51-53. Different program map tables can be associated with different users even if these different users are tuned, at a certain point in time, to the same television channel.

Both program map tables are sent to user devices A-F 41-63 but mapping information (that can be sent out of band) informs user device A 42 that is should filter the first program map table ("PMT A") 310 and informs user devices B-D 52-56 that they should filter the second program map table ("PMT B") 320. Initially, both program map tables are identical to each other—they describe the K'th video stream, the K'th audio stream and the K'th data stream and their PIDs-PID vk, PID ak and PID dk. The transmission of mapping information, PMT A 310 and PMT B 320 can be performed at point of time T1 121.

Between point in time T2 122 and first splicing point 126 users A-D 41-55 view the K'th program. Their devices receive the same multiplex and filter the K'th program.

System 20 can then decide that between first and second splicing points 126 and 128 user device A 42 should filter the J'th program while user devices B-D 52-56 should filter the L'th program. System 20 updates PMT A 310 and PMT B 320 and sends (in a multiplexed manner) the updated program map tables to user devices A-D 41-55 such that at the first splicing point 126 user device A 42 filters the J'th program while users devices B-D 52-56 filter the L'th program. The updated PMT A 310 describes the J'th video stream, the J'th audio stream and the J'th data stream and their PIDs-PID vj, PID aj and PID dj. The updated PMT B 320 describes the L'th video stream, the L'th audio stream and the L'th data stream and their PIDs-PID vl, PID al and PID dl.

System 20 can then decide that after the second splicing point 128 user devices A-D 42-56 should filter the K'th program. System 20 further updates PMT A 310 and PMT B 320 and sends (in a multiplexed manner) the updated program map tables to user devices A-D 42-56 such that after the second splicing point 128 user devices A-D 42-56 filter the K'th program.

Figure 3:
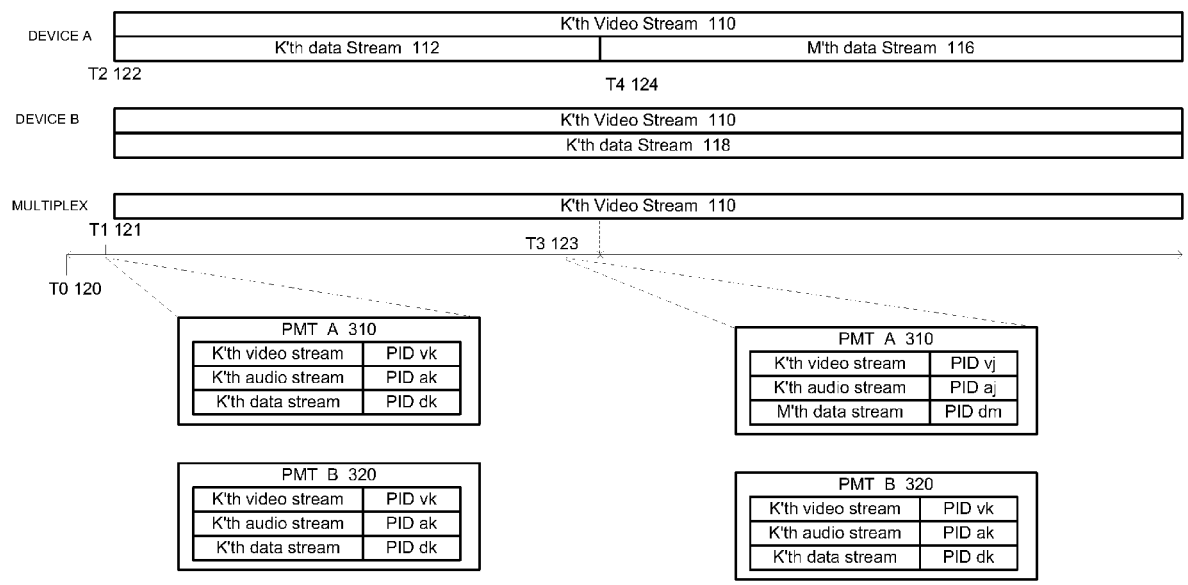
FIG. 3 illustrates multiple streams and program map tables that are sent to two users, according to an embodiment of the invention.

FIG. 3 illustrates multiple streams and program map tables that are sent to two users, according to an embodiment of the invention.

At point in time T0 120 system 20 decides to associate different program map tables with user A 41 and with users B-D 51-55 of the second group of users. Different program map tables can be associated with different users even if these different users are tuned, at a certain point in time, to the same television channel.

Both program map tables are sent to user devices A-D 42-56 but mapping information (that can be sent out of band) informs user device A 42 that is should filter the first program map table ("PMT A") 310 and informs user devices B-D 52-56 that they should filter the second program map table ("PMT B") 320. Initially, both program map tables are identical to each other—they describe the K'th video stream, the K'th audio stream and the K'th data stream and their PIDs-PID vk, PID ak and PID dk. The transmission of mapping information, PMT A 310 and PMT B 320 is illustrated by T1 121.

Between point in time T2 122 and point in time T4 124 users A-D 41-55 view the K'th program. Their user devices receive the same multiplex and filter the K'th program.

System 20 can then decide that after point in time T4 124 between a first and second splicing points 126 and 128 user device A 42 should filter the M'th data stream instead of filtering the K'th data stream. User device A 42 should also continue to filter the K'th video stream and the K'th audio stream. User devices B-D 52-56 should continue filtering the K'th program. System 20 updates PMT A 310 and sends (in a multiplexed manner and at point in time T2 123) the updated program map tables to user devices A—D 42-55 such that at point in time T4 124 user device A 42 filters the M'th data stream, the K'th video stream and the K'th audio stream.

After point in time T4 124 PMT A 310 describes the K'th video stream, the K'th audio stream and the M'th data stream and their PIDs-PID vk, PID ak and PID dm. PMT B 320 describes the K'th video stream, the K'th audio stream and the K'th data stream and their PIDs-PID vk, PID ak and PID dk.

Figure 4:
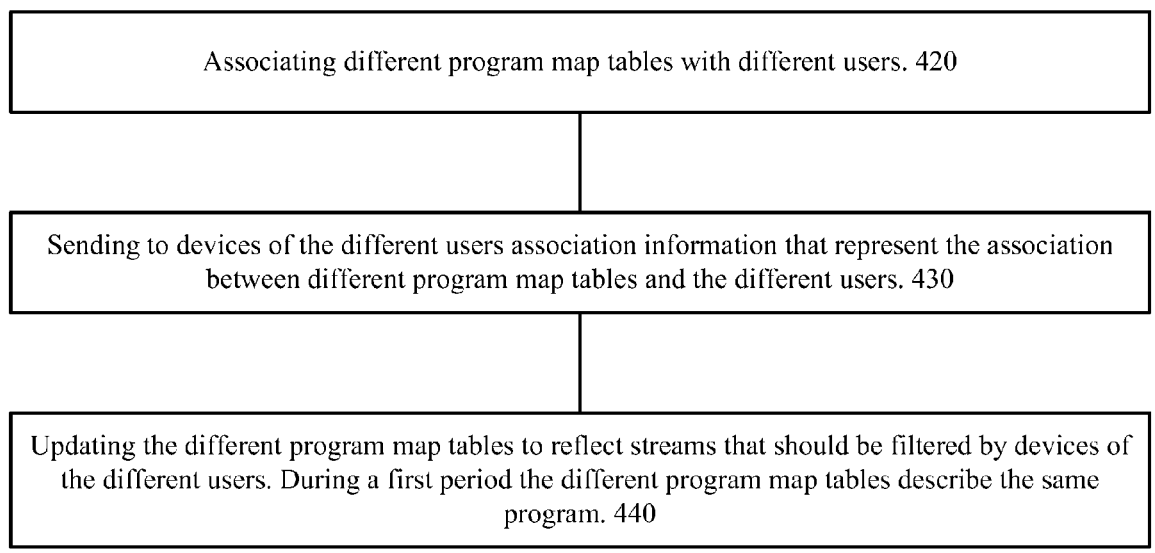
FIG. 4 is a flow chart of a method for managing streams according to an embodiment of the invention.
Figure 5:
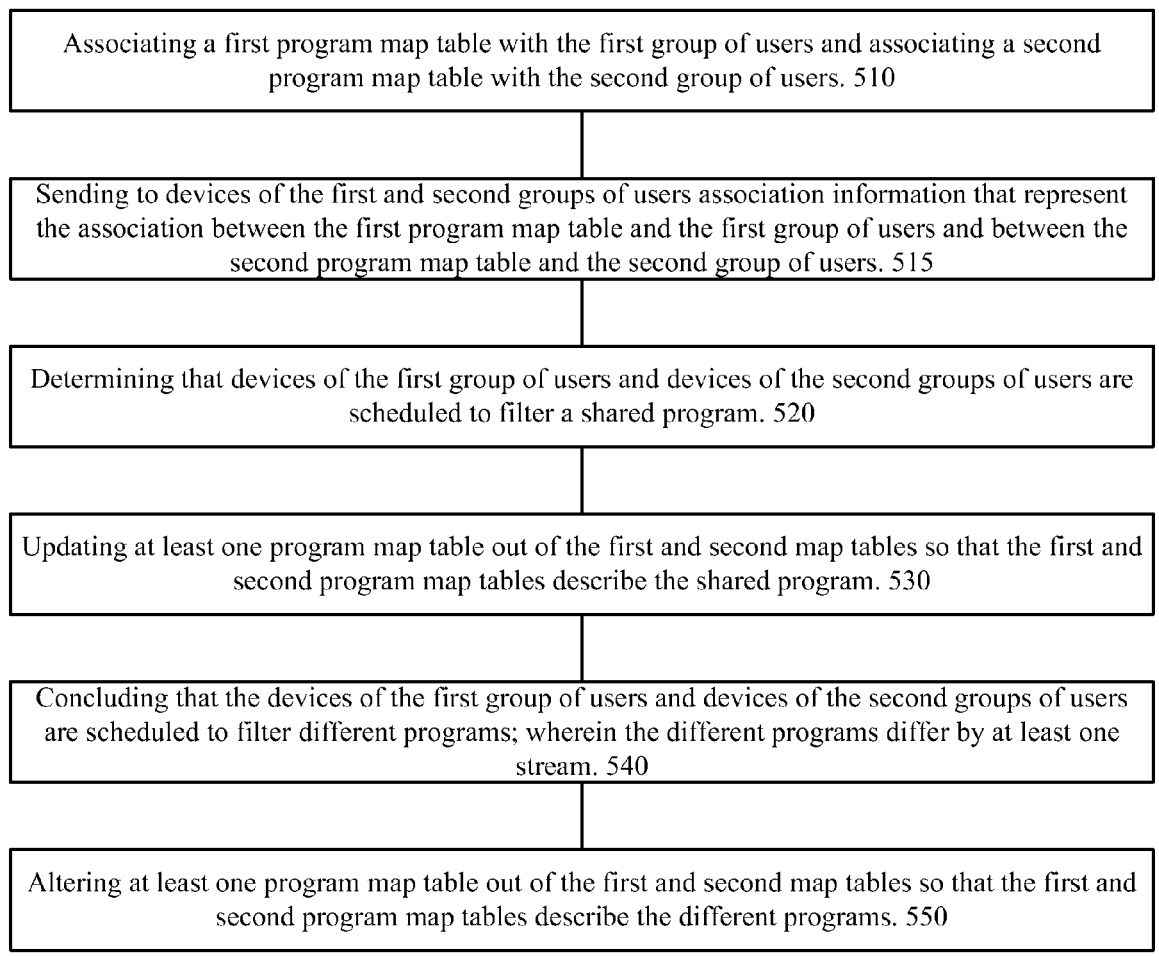
FIG. 5 is a flow chart of a method for managing streams according to an embodiment of the invention.

FIG. 4 illustrates method 400 for managing streams, according to an embodiment of the invention.

Method 400 starts by stage 420 of associating different program map tables with devices of different users that are scheduled to filter, at a certain point of time, streams that form the same program. The different program map tables reflect streams that should be filtered by devices of the different users.

Accordingly, even if different users will view, at a certain point in time, content from the same television channel, they can be associated with different program map tables.

Stage 420 can include generating separate program map tables to different users and generating association information that will map between channel selection commands generated by the different users and between the PID values of the program map tables. The association information can include mapping information and a PAT. Accordingly, the PAT map between Program Number values and PIDs of different program map tables. The mapping information maps between Program Number values and either (i) user devices or (ii) a selection of a television channel by a user.

Conveniently, stage 420 includes associating in response to requests issued by users to receive content.

According to an embodiment of the invention the association can change over time. Once a change occurs, stage 440 and 430 can be are executed.

Stage 420 is followed by stage 430 of sending to devices of the different users association information that represent the association between different program map tables and the different users. It may include sanding a program association table as well as mapping information.

Stage 430 is followed by stage 440 of updating the different program map tables to reflect streams that should be filtered by devices of the different users.

Conveniently, stage 440 includes at least one of the following stages or a combination thereof: (i) updating the different program map tables so that during another point in time the different program map tables describe different programs that include a common stream; (ii) updating the different program map tables so that during another point in time the different program map tables describe different programs that include a common video stream but different data streams; (iii) updating the different program map tables in response to expected replacement of one stream by another; (iv) updating the different program map tables in response to a timing of splicing events.; (v) updating the different program map tables so that during a further point in time the different program map tables describe programs without shared streams; (vi) updating the different program map tables in response to advertisement insertion events.

Assuming that there are two groups of users, each associated with its unique program map table, then multiple iterations of stage 440 can include: (i) determining that devices of the first group of users and devices of the second groups of users are scheduled to filter a shared program and updating at least one program map table out of the first and second map tables so that the first and second program map tables describe the shared program; (ii) concluding that the devices of the first group of users and devices of the second groups of users are scheduled to filter different programs; wherein the different programs differ by at least one stream, and altering at least one program map table out of the first and second map tables so that the first and second program map tables describe the different programs, (iii) altering at least one program table map so that the first and second program map tables describe different programs without shared streams; (iv) altering at least one program table map so that the first and second program map tables describe a different programs that include a common video stream and different data streams; (v) altering at least one program map table in response to expected replacement of one stream by another; (vi) altering at least one program map table in response to a timing of splicing events; and (vii) altering at least one program map table in response to advertisement insertion events.

The invention can be executed by a computer-readable code that includes instructions to execute one or more stages of method 400. The computer-readable code can be stored in a computer readable medium such as but not limited to a disk, a tape, a diskette, a compact disk, a memory unit and the like.

Conveniently, a computer readable medium having computer-readable code embodied therein for sharing media content is provided. The computer-readable code including instructions for associating different program map tables with devices of different users that are scheduled to filter, at a certain point of time, streams that form a same program; whereas the different program map tables reflect streams that should be filtered by devices of the different users.

Conveniently, the computer-readable code includes instructions for sending, in response to the association, to the devices of different users association information that represent the association between different program map tables and the devices of the different users.

Conveniently, the computer-readable code includes instructions for sending, in response to the association, association information that maps different Program Number values to the devices of the different users.

Conveniently, the computer-readable code includes instructions for updating the different program map tables so that during another point in time the different program map tables describe different programs that include at least one common stream.

Conveniently, the computer-readable code includes instructions for updating the different program map tables so that during another point in time the different program map tables describe different programs that include at least one common data stream.

Conveniently, the computer-readable code includes instructions for updating in responsive to an expected replacement of one stream by another stream.

Conveniently, the computer-readable code includes instructions for updating in response to a timing of splicing events.

Conveniently, the computer-readable code includes instructions for associating in response to requests issued by users to receive content.

Conveniently, the computer-readable code includes instructions for updating the different program map tables so that during a further point in time the different program map tables describe programs without shared streams.

Conveniently, the computer-readable code includes instructions for updating in response to an advertisement insertion.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

I claim:

1. A method for managing streams, the method comprising: associating different program map tables with devices of different users that are scheduled to filter, at a certain point of time, streams that form a same program; wherein the different program map tables reflect streams that should be filtered by devices of the different users; wherein each program map table out of the different program map tables lists packet identifier (PID) values of multiple streams that form a program;

sending to the devices of the different users, in response to the association, at least one of: (a) association information that represent the association between different program map tables and the devices of the different users; and (b) association information that maps different Program Number values to the devices of the different users; and updating the different program map tables so that during another point in time the different program map tables describe different programs that comprise at least one different stream; wherein each of the programs comprises multiple streams that are multiplexed together.

2. The method according to claim 1 wherein the sending comprises sending, in response to the association, to the devices of different users association information that represent the association between different program map tables and the devices of the different users.

3. The method according to claim 1 wherein the sending comprises sending, in response to the association, association information that maps different Program Number values to the devices of the different users.

4. The method according to claim 1 wherein the updating further comprising updating the different program map tables so that during the another point in time the different program map tables describe the different programs that comprise at least one common stream.

5. The method according to claim 4 wherein the different program map tables describe programs that differ by their data streams.

6. The method according to claim 4 wherein the updating is responsive to an expected replacement of one stream by another stream.

7. The method according to claim 4 wherein the updating is timed in response to a timing of splicing events.

8. The method according to claim 4 wherein the updating comprises updating the different program map tables so that during a further point in time the different program map tables describe programs without shared streams.

9. The method according to claim 4 wherein the updating is responsive to an advertisement insertion.

10. The method according to claim 1 wherein the associating is responsive to requests issued by users to receive content.

11. A system for managing streams, the system comprising:

a controller, adapted to:

associate different program map tables with devices of different users that are scheduled to filter, at a certain point of time, streams that form a same program;

wherein the different program map tables reflect streams that should be filtered by devices of the different users; wherein each program map table out of the different program map tables lists packet identifier (PID) values of multiple streams that form a program;

wherein the system is further adapted to send to the devices of the different users, in response to the association, at least one of: (a) association information that represent the association between different program map tables and the devices of the different users; and (b) association information that maps different Program Number values to the devices of the different users;

wherein the controller is further adapted to update the different program map tables so that during another point in time the different program map tables describe different programs that comprise at least one different stream; wherein each of the programs comprises multiple streams that are multiplexed together.

12. The system according to claim 11 wherein the controller is adapted to send, in response to the association, to the devices of different users association information that represent the association between different program map tables and the devices of the different users.

13. The system according to claim 11 wherein the controller is adapted to send, in response to the association, association information that maps different Program Number values to the devices of the different users.

14. The system according to claim 11 wherein the controller is adapted to update the different program map tables so that during another point in time the different program map tables describe different programs that comprise at least one common stream.

15. The system according to claim 14 wherein the controller is adapted to update the different program map tables so that during another point in time the different program map tables describe different programs that differ by their data streams.

16. The system according to claim 14 wherein the controller is adapted to update the different program map tables in response to an expected replacement of one stream by another stream.

17. The system according to claim 14 wherein the controller is adapted to update the different program map tables in response to a timing of splicing events.

18. The system according to claim 14 wherein the controller is adapted to update the different program map tables in response to an advertisement insertion.

19. The system according to claim 11 wherein the controller is adapted to associate in response to requests issued by users to receive content.

20. The system according to claim 11 wherein the controller is adapted to update the different program map tables so that during a further point in time the different program map tables describe programs without shared streams.

21. A computer readable medium, wherein the computer readable medium is a non-transitory computer readable medium having computer-readable code embodied therein for sharing media content, wherein the computer-readable code comprises instructions for:

associating different program map tables with devices of different users that are scheduled to filter, at a certain point of time, streams that form a same program;

wherein the different program map tables reflect streams that should be filtered by devices of the different users; wherein each program map table out of the different program map tables lists packet identifier (PID) values of multiple streams that form a program;

sending to the devices of the different users, in response to the association, at least one of: (a) association information that represent the association between different program map tables and the devices of the different users; and (b) association information that maps different Program Number values to the devices of the different users; and updating the different program map tables so that during another point in time the different program map tables describe different programs that comprise at least one different stream; wherein each of the programs comprises multiple streams that are multiplexed together.

22. The computer readable medium of claim 21, wherein the computer-readable code comprises instructions for sending, in response to the association, to the devices of different users association information that represent the association between different program map tables and the devices of the different users.

23. The computer readable medium of claim 21, wherein the computer-readable code comprises instructions for sending, in response to the association, association information that maps different Program Number values to the devices of the different users.

24. The computer readable medium of claim 21, wherein the computer-readable code comprises instructions for updating the different program map tables so that during another point in time the different program map tables describe different programs that comprise at least one common stream.

25. The computer readable medium of claim 24, wherein the computer-readable code comprises instructions for updating the different program map tables so that during another point in time the different program map tables describe different programs that comprise different data streams.

26. The computer readable medium of claim 24, wherein the computer-readable code comprises instructions for updating the different program map tables in response to an expected replacement of one stream by another stream.

27. The computer readable medium of claim 24, wherein the computer-readable code comprises instructions for updating the different program map tables in response to a timing of splicing events.

28. The computer readable medium of claim 21, wherein the computer-readable code comprises instructions for associating in response to requests issued by users to receive content.

29. The computer readable medium of claim 21, wherein the computer-readable code comprises instructions for updating the different program map tables so that during a further point in time the different program map tables describe programs without shared streams.

30. The system according to claim 11, wherein the system is adapted to send to the devices of the different users at least one multiplex comprising the multiple streams of each of the programs over a network that connects the system and the devices of the different users; wherein the system is further adapted to send the association information to the devices of the different user over an out-of-band link that is external to the network.

* * * * *